(12) United States Patent
Boukobza et al.

(10) Patent No.: US 11,161,292 B2
(45) Date of Patent: Nov. 2, 2021

(54) PREFORM PROVIDED WITH A CONCAVE BODY PORTION

(71) Applicant: SIDEL PARTICIPATIONS, Octeville-sur-mer (FR)

(72) Inventors: Michel Boukobza, Octeville-sur-mer (FR); Mickaël Letestu, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 363 days.

(21) Appl. No.: 16/061,194

(22) PCT Filed: Nov. 30, 2016

(86) PCT No.: PCT/FR2016/053148
§ 371 (c)(1),
(2) Date: Jun. 11, 2018

(87) PCT Pub. No.: WO2017/103372
PCT Pub. Date: Jun. 22, 2017

(65) Prior Publication Data
US 2018/0361648 A1    Dec. 20, 2018

(30) Foreign Application Priority Data
Dec. 16, 2015  (FR) ...................................... 1562531

(51) Int. Cl.
*B29C 49/00*    (2006.01)
*B29B 11/14*    (2006.01)
(Continued)

(52) U.S. Cl.
CPC .......... *B29C 49/0073* (2013.01); *B29B 11/14* (2013.01); *B29C 49/0005* (2013.01);
(Continued)

(58) Field of Classification Search
None
See application file for complete search history.

(56) References Cited

U.S. PATENT DOCUMENTS 4,641,758 A    2/1987  Sugiura
6,179,158 B1   1/2001  Koda
(Continued)

FOREIGN PATENT DOCUMENTS

DE    34 86 209 T2   1/1994
EP     0978456 A1    2/2000
(Continued)

OTHER PUBLICATIONS

Database WPI, Week 199931, Thomson Scientific, London, GB; AN 1999-371072, XP002760516.
(Continued)

*Primary Examiner* — Monica A Huson

(57) ABSTRACT

Disclosed is a container perform made from plastic material, including: a body; an open neck that extends from the body from which it is separated by a radially projecting flange; a bottom that closes the body opposite the neck; the body having a concave portion in axial cross section, where: $B \leq 0.9 \cdot A$ $0.5.C \leq C' \leq 0.95.C$ in which A is the overall diameter of the body, measured below the flange; B is the outer diameter of the bottom, measured at the junction of same with the body; C is the cumulative height of the body and the bottom, measured from the flange; C' is the height, measured axially, of the concave portion of the body, and the concave portion has, in axial cross-section, on an outer surface, an outer radius of curvature RE such that: $1.5.0 \leq RE \leq 10.C$

19 Claims, 4 Drawing Sheets

Figure 1:
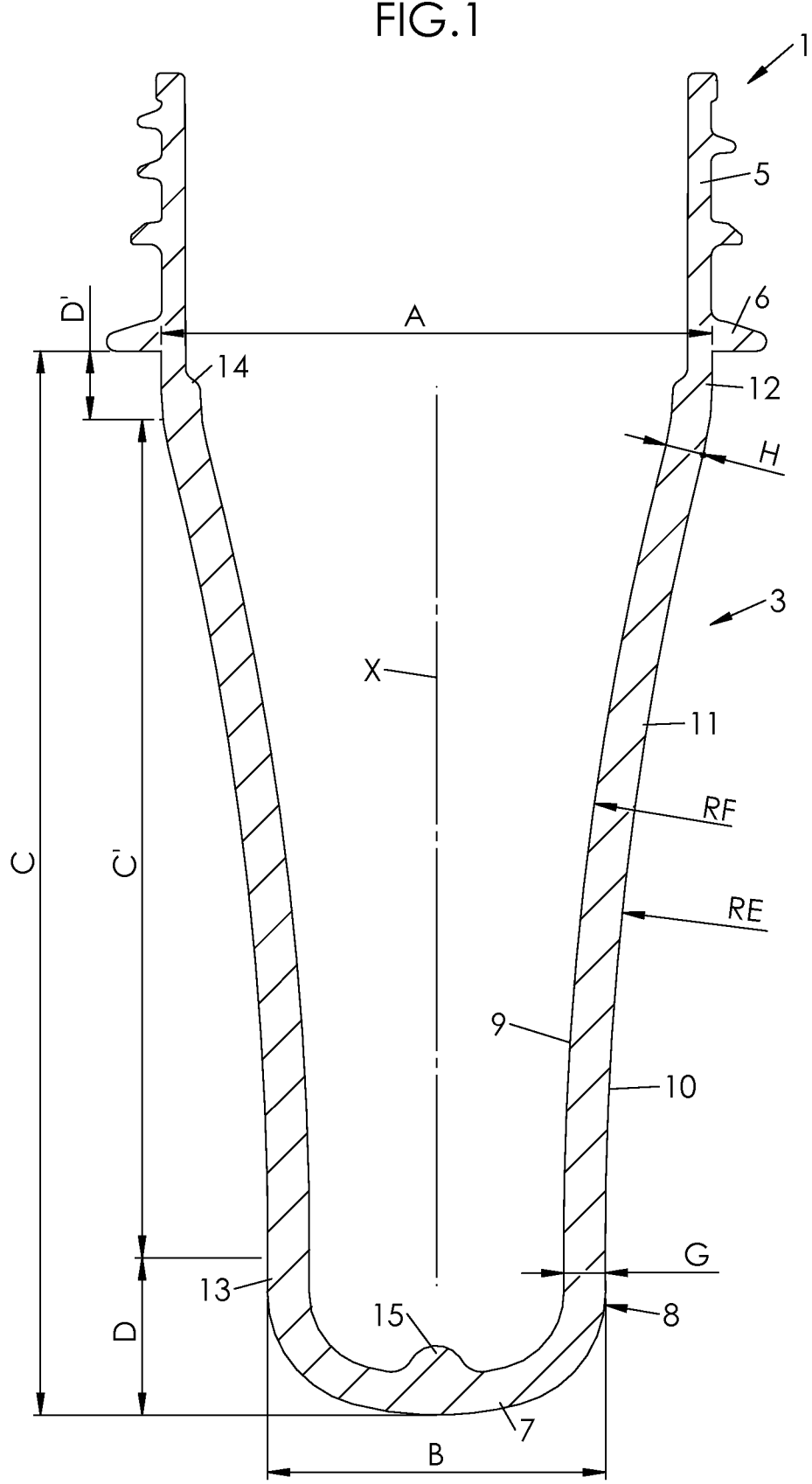

(51) Int. Cl.
  *B29C 49/06* (2006.01)
  *B29C 49/64* (2006.01)
  *B29K 67/00* (2006.01)
  *B29L 31/00* (2006.01)

(52) U.S. Cl.
  CPC .......... *B29C 49/06* (2013.01); *B29C 49/6418* (2013.01); *B29B 2911/1402* (2013.01); *B29B 2911/1404* (2013.01); *B29B 2911/147* (2013.01); *B29B 2911/14026* (2013.01); *B29B 2911/14033* (2013.01); *B29B 2911/1448* (2013.01); *B29B 2911/1488* (2013.01); *B29B 2911/14331* (2015.05); *B29B 2911/14337* (2015.05); *B29B 2911/14486* (2013.01); *B29B 2911/14633* (2013.01); *B29B 2911/14693* (2013.01); *B29B 2911/14753* (2013.01); *B29K 2067/003* (2013.01); *B29L 2031/7158* (2013.01)

(56) References Cited

U.S. PATENT DOCUMENTS 9,238,342 B2    1/2016   Klausriegler
2001/0055657 A1  12/2001  Slat

FOREIGN PATENT DOCUMENTS

| | | |
|---|---|---|
| EP | 2 720 842 B1 | 8/2017 |
| WO | 99/28196 A1 | 6/1999 |
| WO | 2012/092639 A2 | 7/2012 |
| WO | 2012/172250 A1 | 12/2012 |

OTHER PUBLICATIONS

International Search Report, dated Feb. 27, 2017, from corresponding PCT application No. PCT/FR2016/053148.

PREFORM PROVIDED WITH A CONCAVE BODY PORTION

The invention relates to the manufacture of containers from preforms made of plastic material, particularly of polyethylene terephthalate (PET).

More specifically, the invention relates to a preform designed for the forming of a container by blow molding or stretch blow molding, within a mold bearing the impression of the container or freely (i.e., in the absence of a mold).

A container ordinarily comprises a generally symmetrical lateral wall of revolution that extends along a central axis, a neck that extends in continuation of the lateral wall and through which the container is intended to be filled and emptied, and a bottom that extends transversely from a lower end of the body and by which the container is intended to rest on a plane surface.

A preform ordinarily comprises an approximately cylindrically-shaped body (intended to form the lateral wall of the container), an open neck that extends in continuation of the body from an upper end of it, and from which it is separated by a flange (the neck remains unchanged during the process of forming the container), as well as a bottom that closes the body at a lower end of it (and intended to form the bottom of the container).

To form the container from the preform, the first step is to heat the body and the bottom of the preform to a temperature greater than the glass transition temperature of the material (which, for PET, is about 80° C.). Then, a fluid (typically air) is injected under pressure into the preform, whose body undergoes an inflation that is simultaneously axial and radial until achieving the desired shape for the body of the container. Generally, the axial expansion is achieved by a stretching using a rod.

The heating is generally carried out in a heating unit (also called a furnace) equipped with multiple sources of infrared radiation to which the preforms are exposed. These sources are generally halogen lamps, which radiate over a rather wide spectrum including short-wave infrared (and optionally a portion of the mid infrared) as well as at least a portion of the visible spectrum. The halogen lamps have as major defects a low (indeed nonexistent) directivity and a relatively short service life.

An alternative heating technology is under development, based on the use of monochromatic (or quasi-monochromatic) radiation sources, which offer a better directivity and a greater service life; see, for example, the European patent application EP 2 720 842 (Sidel Participations), which describes a method for heating preforms by means of an array of laser diodes of the type having a vertical-cavity surface-emitting laser (VCSEL).

Numerous tests of this new technology, conducted on preforms of all shapes, have shown that it is necessary to continue the development of it, because noted in the preforms is the existence of zones of overheating of the material, which even a fine adjustment of the energy distribution of the sources does not make it possible to overcome. All things considered, it has become apparent that the outline and the sizing of the preforms need to be reworked.

One object consequently is to propose a preform that, when exposed to a monochromatic or quasi-monochromatic infrared radiation, can be heated relatively uniformly, i.e., without having zones of unwanted local overheating.

For this purpose, first a container preform made of plastic material is proposed, which comprises:

a symmetrical body of revolution around a central axis;
an open neck that extends in continuation of the body from which it is separated by a radial protruding flange;
a bottom that closes the body opposite the neck; in which the body has a portion that is concave in axial section and in which:

$$B \leq 0.9 \cdot A$$

$$0.5 \cdot C \leq C' \leq 0.95 \cdot C$$

where: A is the overall diameter of the body, measured under the flange;
B is the outer diameter of the bottom, measured at its junction with the body;
C is the cumulative height of the body and the bottom, measured from the flange;
C' is the height, measured axially, of the concave portion of the body,
and in which the concave portion 11 has, in axial section, on an outside surface 10, an outside radius of curvature RE such that:

$$1.5 \cdot C \leq RE \leq 10 \cdot C.$$

These characteristics contribute to minimizing the refraction in the material, promoting an improved quality of heating.

According to a particular embodiment:

$$0.65 \cdot C \leq C' \leq 0.85 \cdot C$$

Moreover, the preform can satisfy the following condition:

$$H \leq G$$

G is the wall thickness of the preform measured at a lower end of the concave portion;
H is the wall thickness of the preform measured at an upper end of the concave portion;
with, preferably:

$$H \leq 0.9 \cdot G$$

The following additional condition can be met:

$$H \geq 0.5 \cdot G$$

with, preferably:

$$H \geq 0.7 \cdot G$$

Second, a method is proposed for manufacturing a container by blow molding or stretch blow molding, which comprises:

the furnishing of a preform as described above;
the heating of the body of the preform by exposure to a monochromatic or quasi-monochromatic infrared radiation with a predetermined intensity;
the forming of the container by injection of a pressurized fluid into the preform that is thus heated.

This method advantageously comprises, between the heating and the forming, the introduction of the preform into a mold bearing the impression of the container.

Figure 2:
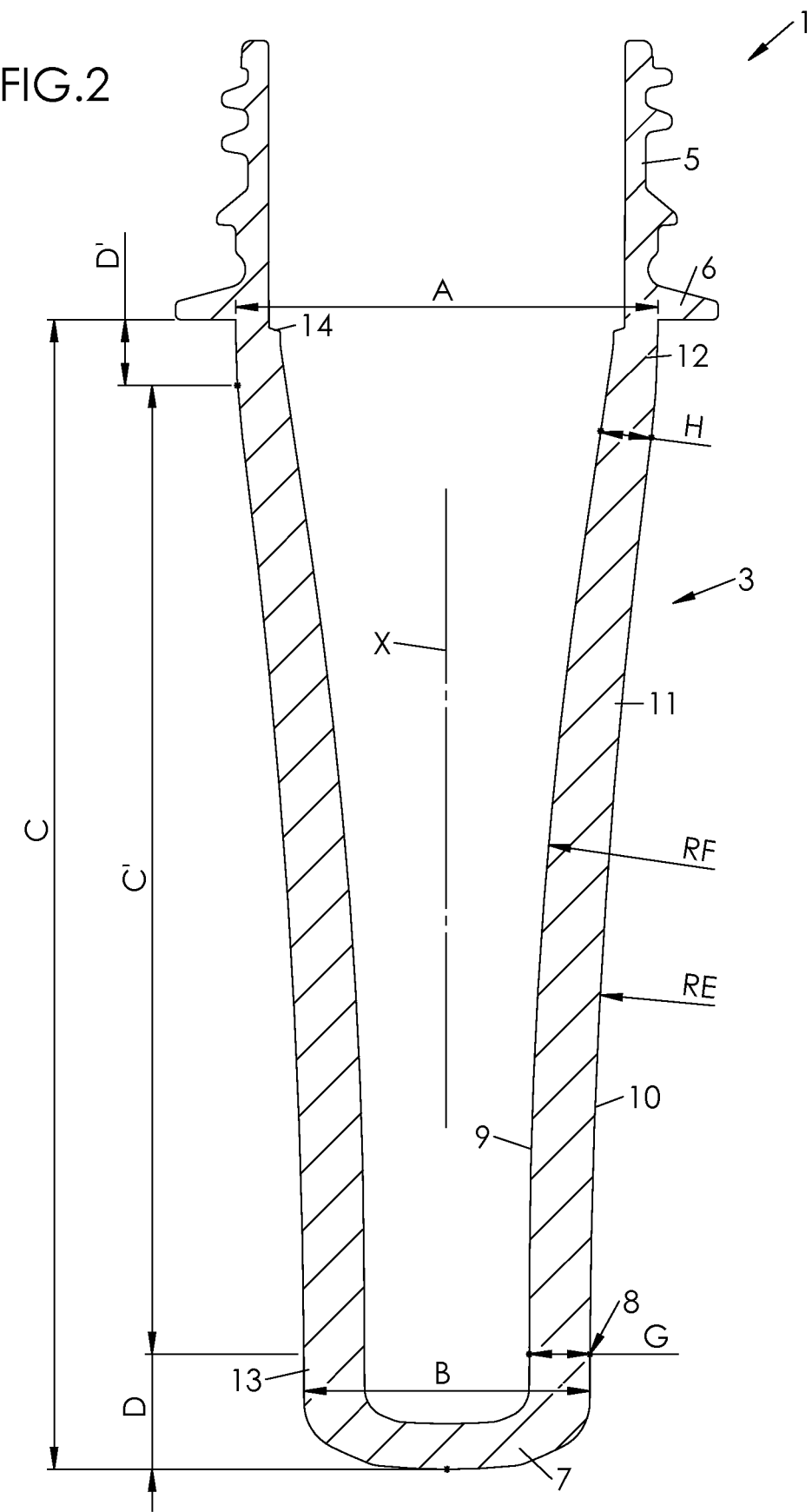
Figure 3:
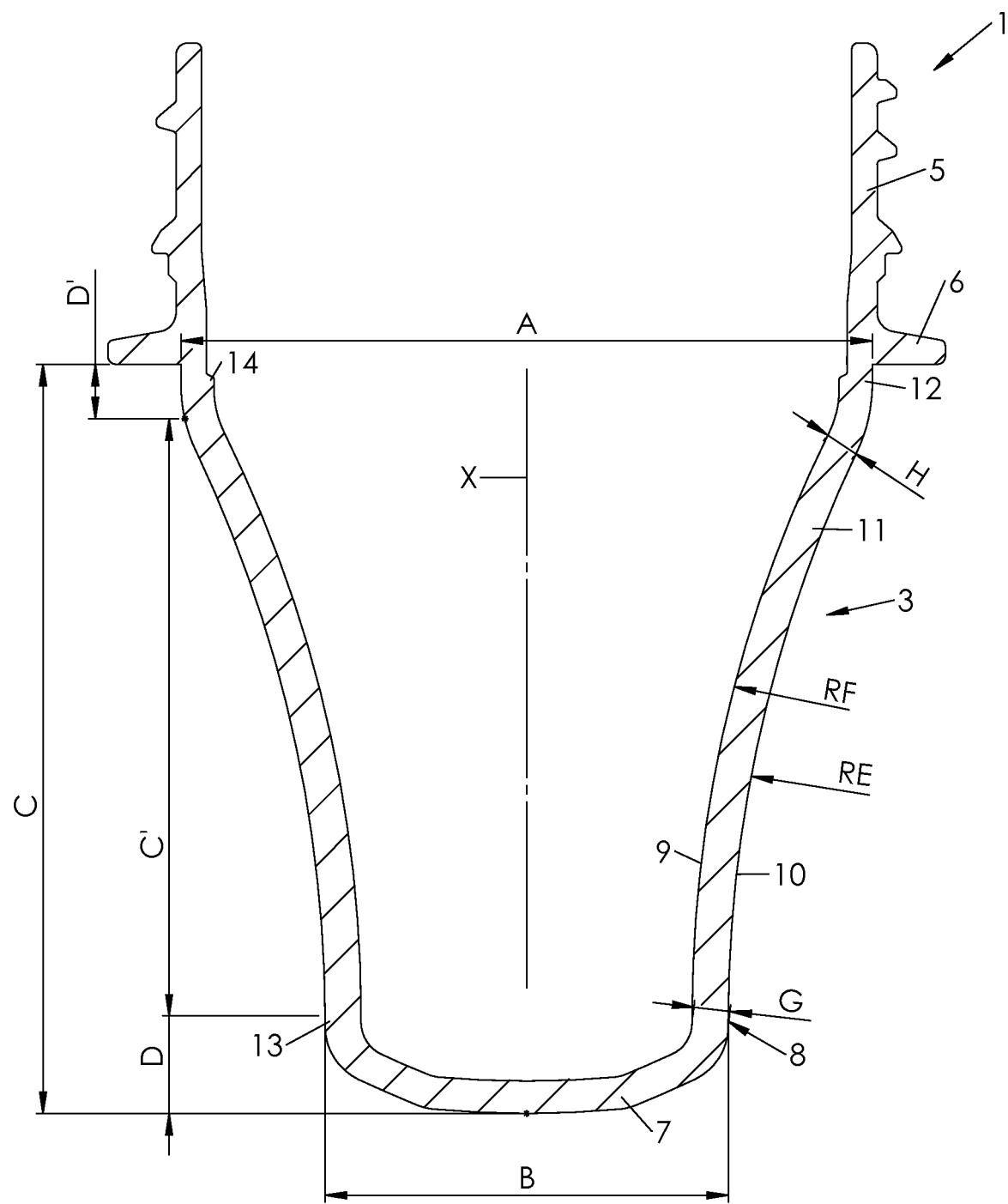
Figure 4:
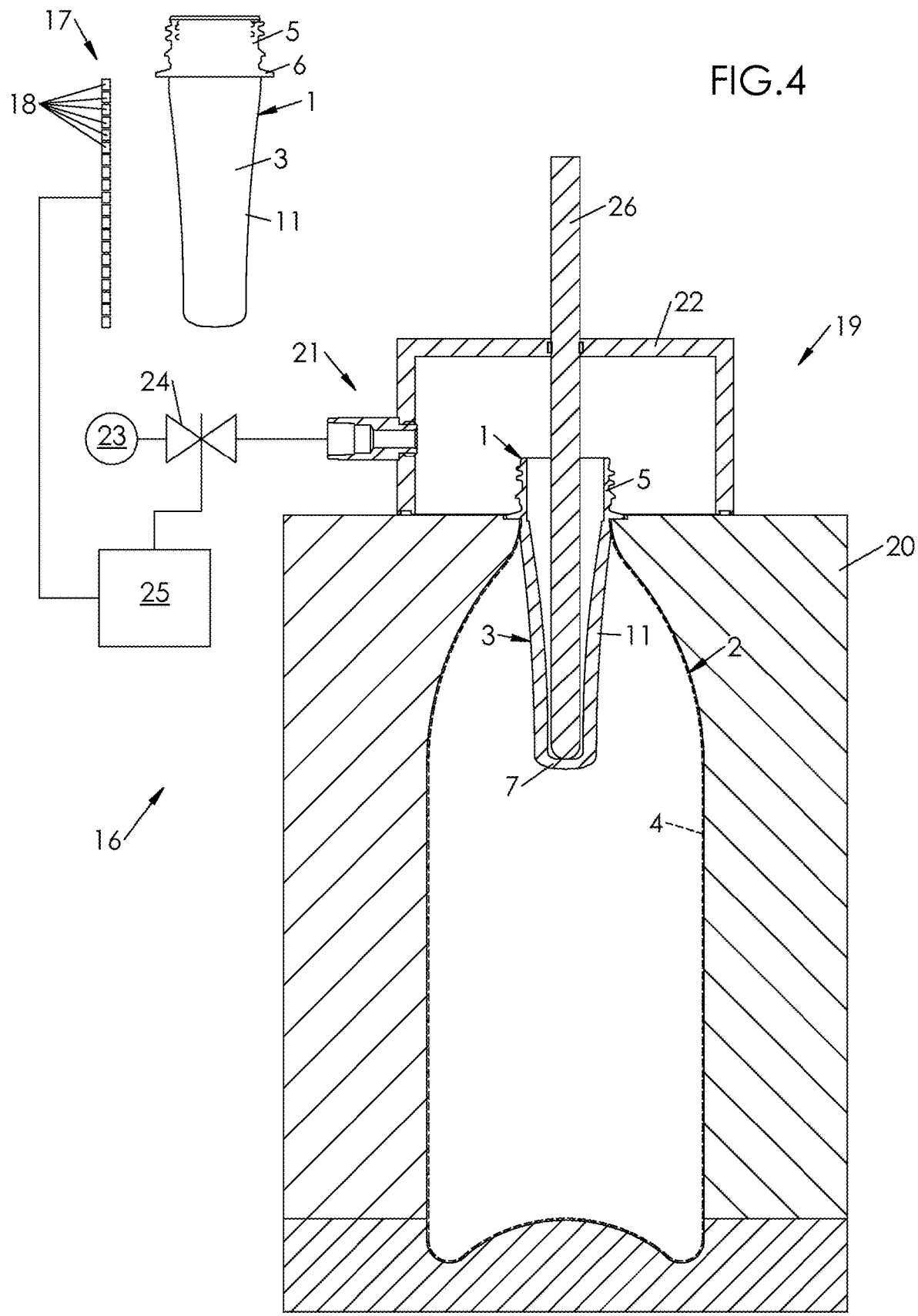

Other objects and advantages of the invention will be brought out in the description of an embodiment, given below with reference to the accompanying drawings in which:

FIG. 1 is a cutaway view of a container preform, according to a first embodiment;
FIG. 2 is a cutaway view of a container preform, according to a second embodiment;
FIG. 3 is a cutaway view of a container preform, according to a third embodiment;

FIG. 4 is a diagram illustrating the manufacture of a container from a preform.

Shown in each of FIGS. 1, 2 and 3 is a preform 1 made of plastic material such as PET (polyethylene terephthalate), from which a container 2 (as illustrated in dashed lines in FIG. 4) is intended to be formed by blow molding or stretch blow molding. Each preform 1 comprises, first, a body 3 that extends in a symmetrical manner of revolution around a central axis X.

The body 3 of the preform 1 is intended to form a body 4 of the container 2.

Second, each preform 1 comprises an open neck 5 that extends in continuation of the body 3 from an upper end of it. The neck 5 has its final shape, which it is intended to maintain throughout the forming of the container 2.

The neck 5 ends with a radially protruding flange 6, which separates the neck 5 from the body 3 and by which the preform 1 (then the container 2) is suspended or more generally held during various operations of conveying, of heating, or of forming of the preform 1 (then, respectively, of filling, capping and labeling of the container 2).

Third, each preform 1 comprises a bottom 7 that closes the body 3 from a lower end 8 of it, i.e., the material of the bottom 7 extends from the lower end 8 of the body 3 to join radially the central axis X and thus to close the preform 1 opposite the neck 5. The body 3 and the bottom 7 are symmetrical in revolution around the central axis X, i.e., they are invariant in any longitudinal section plane (in other words, passing through the central axis X, corresponding to the plane of the sheet in the figures).

The preform 1 has an inside surface 9 and an outside surface 10.

Below, the terms "concave" and "convex" are understood to be in reference to the internal volume of the preform 1. In other words, a zone is said to be concave if its concavity is turned outward from the preform 1, and, conversely, convex if its convexity is turned outward from the preform 1.

As is seen in each of FIGS. 1, 2 and 3, the body 3 of the preform 1 has a portion 11 that is concave in axial section (i.e., in any section plane containing the axis X, such as the section plane of FIGS. 1, 2 and 3).

As in the examples illustrated, the body 3 of the preform 1 can further comprise:
  a top portion 12 for connecting the concave portion 11 to the flange 6 and/or
  a bottom portion 13 for connecting the concave portion 11 to the bottom 7.

The connecting top portion 12 is advantageously cylindrical on the outside surface 10.

As for the connecting bottom portion 13, it is advantageously slightly tapered, i.e., it is based on a cone whose apex is located on the axis X at a distance from the preform 1, on the side of the bottom 7.

For the purposes of the shaping and sizing of the preform 1, noted is:
A the overall diameter of the body 3, measured under the flange 6;
B the outer diameter of the bottom 7, measured at the junction with the body 3 (in other words, the overall diameter of the bottom 7);
C the cumulative height of the body 3 (including the concave portion 11, the connecting top portion 12 and the connecting bottom portion 13) and the bottom 7, measured axially (i.e., parallel to the axis X);
C' the height of the concave portion 11 of the body 3, measured axially (i.e., parallel to the axis X);
D the cumulative height of the bottom 7 and the connecting bottom portion 13, measured axially;
D' the height of the connecting top portion 12, measured axially;
RE the mean radius of curvature of the concave portion 11, measured on the outside surface 10 and in a longitudinal section plane;
RF the mean radius of curvature of the concave portion 11, measured on the inside surface 9 and in a longitudinal section plane;
G the wall thickness of the preform 1, measured at a lower end of the concave portion 11 (at the junction with the connecting bottom portion 13);
H the wall thickness of the preform 1, measured at an upper end of the concave portion 11 (at the junction with the connecting top portion 12).

The diameters A and B are selected to ensure that:

$$B \leq 0.9 \cdot A$$

Furthermore, the height C' of the concave portion 11 of the body 3 is selected to ensure that:

$$0.5 \cdot C \leq C' \leq 0.95 \cdot C$$

and the concave portion 11 has, in axial section, on an outside surface 10, an outside radius of curvature RE to ensure that:

$$1.5 \cdot C \leq RE \leq 10 \cdot C.$$

Preferably, the height C' of the concave portion 11 of the body 3 is selected to ensure that:

$$0.65 \cdot C \leq C' \leq 0.85 \cdot C$$

Thus, on the one hand, the concave portion 11 of the body 3 appears markedly tapered (by comparison with an ordinary preform with an approximately cylindrical body), and, on the other hand, this concave portion 11 extends over a signification portion of the total height of the preform 1 (excluding the neck).

This creates, relative to an ordinary preform with an approximately cylindrical body, an improved thermal response during a heating performed by using monochromatic or quasi-monochromatic infrared radiation sources (particularly laser sources). In particular, the refraction is minimized, promoting an improved control of the heating, and the risk of the appearance of overheated zones is reduced.

To optimize the thermal response further, other parameters, among those listed above, can be calculated in a particular manner.

Thus, the wall thickness of the body 3 is preferably approximately constant over the entire height of the concave portion 11 or is decreasing continuously to avoid any edge or sudden breaking of curvature.

Furthermore, the wall thickness H at the upper end of the concave portion 11 is advantageously less than the wall thickness G at the lower end of the concave portion 11:

$$H \leq G$$

with, preferably:

$$H \leq 0.9 \cdot G$$

However, it is preferable that the difference in thickness at the lower end and at the upper end of the portion 11 not be too great:

$$H \geq 0.5 \cdot G$$

with, preferably:

$$H \geq 0.7 \cdot G$$

Since the preform 1 is noticeably thicker in the area of the body 3 than in the area of the neck 5, an offset 14, to make up for this difference in thickness, is provided on the inside surface 9 at the level of the flange 6.

Since the neck 5 must not be heated, the presence of this offset 14 does not have any effect on the overall quality of the heating of the preform 1.

In FIGS. 1, 2 and 3, three preforms 1 have been shown respectively in different shapes but satisfying all of the criteria defined above.

The table below provides the numerical values (all expressed in mm) of the parameters listed above, for these three preforms 1:

|    | FIG. 1 | FIG. 2 | FIG. 3 |
|----|--------|--------|--------|
| A  | 24     | 26     | 35.5   |
| B  | 14.5   | 17.5   | 20.7   |
| C  | 46     | 70     | 39     |
| C' | 36     | 59     | 31     |
| D  | 7      | 7      | 5      |
| D' | 3      | 4      | 3      |
| RE | 140    | 450    | 68     |
| RF | 136    | 305    | 67     |
| G  | 1.8    | 3.7    | 2      |
| H  | 1.6    | 3      | 2      |

The preform 1 of FIG. 1 is distinct from the preforms of FIGS. 2 and 3 by a bottom 7 having an approximately hemispherical shape as well as by the presence, in the center of the bottom 7, of an alignment stub 15 protruding inward from the inside surface 9. This stub 15 is intended to fit in a complementary recess formed at one end of a stretching rod to guarantee the centering of the preform 1 during the forming of the container 2.

In contrast, the bottom 7 of the preforms 1 of FIGS. 2 and 3 is approximately flat. This shape has the advantage of minimizing the refraction of the radiation emitted by the material of the preform 1, promoting an improved control of the heating.

Shown very diagrammatically in FIG. 4 is an installation 16 for manufacturing a container 2 from a preform 1 as described above.

This installation 16 comprises a heating unit 17 provided with a multiplicity of monochromatic or quasi-monochromatic electromagnetic radiation sources 18 in the infrared range.

In theory, a monochromatic source is an ideal source emitting a single frequency sine wave. In other words, its frequency spectrum consists of a single ray with zero spectral width (Dirac).

In practice, such a source does not exist, a real source being at best quasi-monochromatic, i.e., its frequency spectrum extends over a small but not zero spectral bandwidth, centered on a main frequency where the intensity of the radiation is greatest.

The sources 18 are preferably organized in an array; it concerns, for example, laser diodes of the VCSEL type, each emitting a radiation with a power of several tens of milliwatts at a wavelength on the order of 1 µm.

The installation 16 also comprises a forming unit 19 that includes at least one mold 20 bearing the impression of the container 2. In practice, the forming unit 19 can comprise a series of molds 20 mounted on a rotating carousel. The forming unit 19 comprises, for each mold, an injection device 21 comprising a nozzle 22 able to be applied in a fluidtight manner against an upper surface of the mold 20 and connected to a pressurized fluid source 23 (for example, air) via a distributor 24 (for example, a solenoid valve). The installation further comprises a control unit 25 connected to the sources 23 and to the distributor 24 to control respectively the pressure adjustment, their opening and their closing.

In the example illustrated, the forming unit 19 further comprises, for each mold 20, a rod 26 mounted to slide in relation to the mold 20 to ensure, at the same time as the blow molding, a stretching of the preform 1.

Thus, to form a container 2, the procedure is as follows:

The first step is to furnish a preform 1 as described above, from a container, for example, in which all identical preforms are stored.

The body 3 and the bottom 7 of the preform 1 are then heated within the heating unit 17 by exposure to a monochromatic or quasi-monochromatic infrared radiation of predetermined intensity emitted by the sources 18. During the heating, the preform 1 is placed in rotation around its axis X to ensure a uniform exposure of its body 3 and its bottom 7 to the radiation.

Taking into account its shape and its sizing, as described above, it is observed that the preform 1 does not refract much of the radiation that it receives. The result is an improved energy distribution within the material, an improved control of the heating, and an improved correlation between the adjusted power profile in the area of the sources 18 and the thermal profile found (for example by means of a thermal camera) on the preform 1.

Then, the thus heated preform 1 is introduced into the mold 20, and the container 2 is formed by injection into the preform 1 of a pressurized fluid (for example, air) coming from the source 23.

The injection forming can comprise a step for axial stretching of the preform 1 using a rod (see the rod 26 in FIG. 4).

As a variant, the forming could be carried out freely, i.e., without a mold.

The invention claimed is:

1. Container preform (1) made of plastic material, which comprises:
    a symmetrical body (3) of revolution around a central axis (X);
    an open neck (5) that extends in continuation of the body (3) from which it is separated by a radial protruding flange (6);
    a bottom (7) that closes the body (3) opposite the neck (5);
    wherein the body (3) has a portion (11) that is concave in axial section and wherein:

$B \leq 0.9 \cdot A$ $0.5 \cdot C \leq C' \leq 0.95 \cdot C$ where: A is the overall diameter of the body (3), measured under the flange (6);
    B is the outer diameter of the bottom (7), measured at its junction with the body (3);
    C is the cumulative height of the body (3) and the bottom (7), measured from the flange (6);
    C' is the height, measured axially, of the concave portion (11) of the body (3), And
    wherein the concave portion (11) has, in axial section, on an outside surface (10), an outside radius of curvature RE such that:

$1.5 \cdot C \leq RE \leq 10 \cdot C$.

2. Preform (1) according to claim 1, wherein:

$0.65 \cdot C \leq C' \leq 0.85 \cdot C$.

3. Preform (1) according to claim 1, wherein:

$$H \leq G$$

where: G is the wall thickness of the preform (1) measured at a lower end of the concave portion (11);
H is the wall thickness of the preform (1) measured at an upper end of the concave portion (11).

4. Preform (1) according to claim 3, wherein:

$$H \leq 0.9 \cdot G$$

5. Preform (1) according to claim 3, wherein:

$$H \geq 0.5 \cdot G.$$

6. Preform (1) according to claim 5, wherein:

$$H \geq 0.7 \cdot G.$$

7. Method for manufacturing a container (2) by blow molding or stretch blow molding, which comprises:
the furnishing of a preform (1) according to claim 1;
the heating of the body (3) of the preform (1) by exposure to a monochromatic or quasi-monochromatic infrared radiation of a predetermined intensity;
the forming of the container (2) by injection of a pressurized fluid into the thus heated preform (1).

8. Method according to claim 7, further comprising, between the heating and the forming, the introduction of the preform (1) into a mold (20) bearing the impression of the container (2).

9. Preform (1) according to claim 2, wherein:

$$H \leq G$$

where: G is the wall thickness of the preform (1) measured at a lower end of the concave portion (11);
H is the wall thickness of the preform (1) measured at an upper end of the concave portion (11).

10. Preform (1) according to claim 4, wherein:

$$H \geq 0.5 \cdot G.$$

11. Method for manufacturing a container (2) by blow molding or stretch blow molding, which comprises:
the furnishing of a preform (1) according to claim 2;
the heating of the body (3) of the preform (1) by exposure to a monochromatic or quasi-monochromatic infrared radiation of a predetermined intensity;
the forming of the container (2) by injection of a pressurized fluid into the thus heated preform (1).

12. Method for manufacturing a container (2) by blow molding or stretch blow molding, which comprises:
the furnishing of a preform (1) according to claim 3;
the heating of the body (3) of the preform (1) by exposure to a monochromatic or quasi-monochromatic infrared radiation of a predetermined intensity;
the forming of the container (2) by injection of a pressurized fluid into the thus heated preform (1).

13. Method for manufacturing a container (2) by blow molding or stretch blow molding, which comprises:
the furnishing of a preform (1) according to claim 4;
the heating of the body (3) of the preform (1) by exposure to a monochromatic or quasi-monochromatic infrared radiation of a predetermined intensity;
the forming of the container (2) by injection of a pressurized fluid into the thus heated preform (1).

14. Method for manufacturing a container (2) by blow molding or stretch blow molding, which comprises:
the furnishing of a preform (1) according to claim 5;
the heating of the body (3) of the preform (1) by exposure to a monochromatic or quasi-monochromatic infrared radiation of a predetermined intensity;
the forming of the container (2) by injection of a pressurized fluid into the thus heated preform (1).

15. Method for manufacturing a container (2) by blow molding or stretch blow molding, which comprises:
the furnishing of a preform (1) according to claim 6;
the heating of the body (3) of the preform (1) by exposure to a monochromatic or quasi-monochromatic infrared radiation of a predetermined intensity;
the forming of the container (2) by injection of a pressurized fluid into the thus heated preform (1).

16. Preform (1) according to claim 9, wherein:

$$H \geq 0.5 \cdot G$$

17. Method for manufacturing a container (2) by blow molding or stretch blow molding, which comprises:
the furnishing of a preform (1) according to claim 9;
the heating of the body (3) of the preform (1) by exposure to a monochromatic or quasi-monochromatic infrared radiation of a predetermined intensity;
the forming of the container (2) by injection of a pressurized fluid into the thus heated preform (1).

18. Method for manufacturing a container (2) by blow molding or stretch blow molding, which comprises:
the furnishing of a preform (1) according to claim 10;
the heating of the body (3) of the preform (1) by exposure to a monochromatic or quasi-monochromatic infrared radiation of a predetermined intensity;
the forming of the container (2) by injection of a pressurized fluid into the thus heated preform (1).

19. Method for manufacturing a container (2) by blow molding or stretch blow molding, which comprises:
the furnishing of a preform (1) according to claim 16;
the heating of the body (3) of the preform (1) by exposure to a monochromatic or quasi-monochromatic infrared radiation of a predetermined intensity;
the forming of the container (2) by injection of a pressurized fluid into the thus heated preform (1).

* * * * *